United States Patent [19]

Kuwabara et al.

[11] Patent Number: 4,593,386

[45] Date of Patent: Jun. 3, 1986

[54] OPTICAL DISC PLAYER WITH IMPROVED TRACKING CONTROL

[75] Inventors: Shinichiro Kuwabara, Tokyo; Kiyoshi Ohsato, Chiba; Mikio Sugiki, Yokohama, all of Japan

[73] Assignee: Sony Corporation, Tokyo, Japan

[21] Appl. No.: 511,912

[22] Filed: Jul. 8, 1983

[30] Foreign Application Priority Data

Jul. 10, 1982 [JP] Japan ................................ 57/120440

[51] Int. Cl.[4] .......................... G11B 7/13; G11B 7/095

[52] U.S. Cl. .......................................... 369/46; 369/44

[58] Field of Search ........................ 369/46, 45, 44, 43; 250/201 DF

[56] References Cited

U.S. PATENT DOCUMENTS 4,467,462 8/1984 Shibata .............................. 369/46 X 4,502,134 2/1985 Kondo et al. ......................... 369/46

*Primary Examiner*—Raymond F. Cardillo

*Assistant Examiner*—Robert A. Weinhardt

*Attorney, Agent, or Firm*—Lewis H. Eslinger; Alvin Sinderbrand

[57] ABSTRACT

In an optical disc player in which a reading light beam is caused to impinge on an optical disc having a record track formed with an alignment of geometric variations such as a plurality of pits provided in response to information to be modulated in intensity by the record track and a photodetector is provided for detecting the reading light beam coming from the optical disc to generate an output varying in response to the variations in intensity of the detected reading light beam; there are provided a first circuit for producing a reproduced information signal having level variations representing the geometric variations and a tracking error signal which may have level variations depending on the size of each segment of the geometric variations on the strength of the output of the photodetector, a second circuit for detecting the duration of a portion corresponding to each segment of the geometric variations of the reproduced information signal or output of the photodetector and extracting selectively the level of the tracking error signal whenever the detected duration is measured within a predetermined time range so as to produce a modified tracking error signal having the extracted level, and a control circuit for performing tracking control in relation to the reading light beam in response to the modified tracking error signal.

6 Claims, 26 Drawing Figures

FIG. 4
PRIOR ART
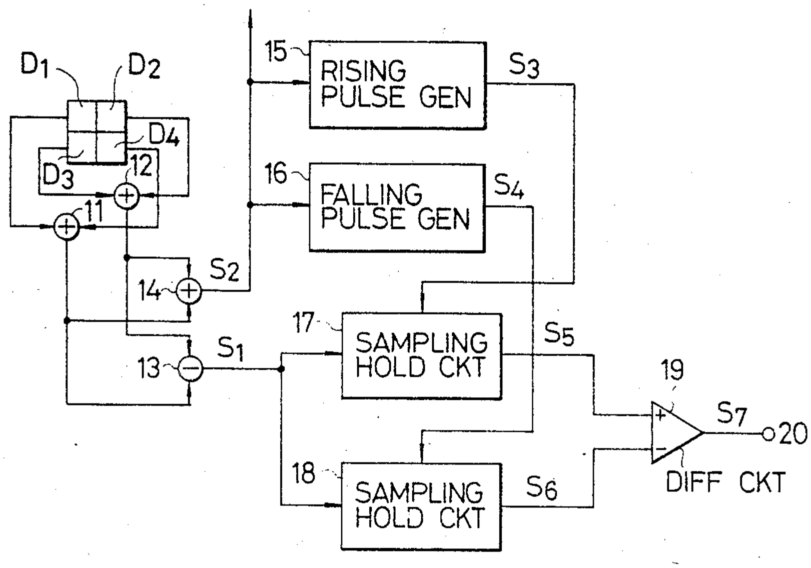
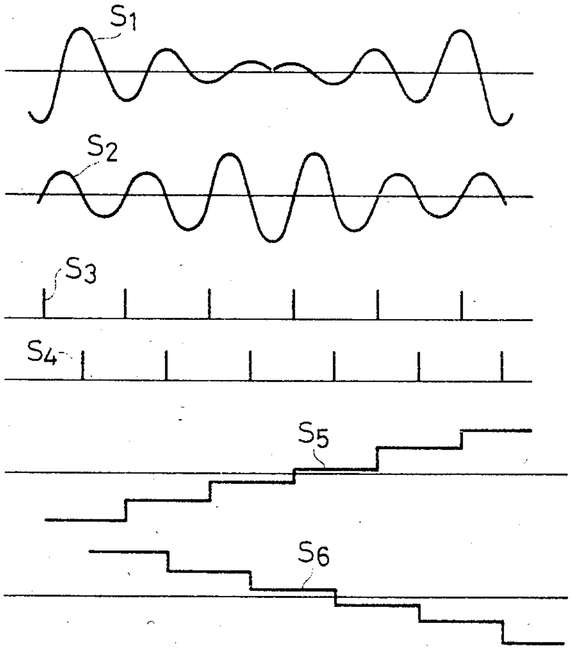
FIG. 5A
FIG. 5B
FIG. 5C
FIG. 5D
FIG. 5E
FIG. 5F

OPTICAL DISC PLAYER WITH IMPROVED TRACKING CONTROL

BACKGROUND OF THE INVENTION

This invention relates generally to an optical disc player in which a reading light beam is caused to impinge on an optical disc having information recorded thereon and then the reading light beam coming from the optical disc is detected to reproduce the information, and more particularly, is directed to an improved optical disc player in which a tracking error signal used for controlling a reading light beam to impinge correctly on an optical disc can be obtained through an arrangement of optical components relatively simplified in configuration and tracking control for the reading light beam can be accurately carried out in accordance with the tracking error signal thus obtained.

For an optical disc player in which a light beam is utilized for reproducing information from an optical disc having thereon a record track which is formed with an alignment of geometric variations such as a plurality of pits provided in response to the information, it is required to perform focus control for maintaining correct focus of the light beam caused to impinge on the optical disc and tracking control for maintaining the light beam in correct tracking relation to the record track on the optical disc being traced thereby. In order to carry out such focus control and tracking control, the optical disc player is operative to detect defocus of the light beam at the record track on the optical disc and produce a first error signal representing the detected defocusing of the light beam and also to detect positional deviation of the light beam from the center of the record track on the optical disc and produce a second error signal representing the detected positional deviation of the light beam. Usually, the first error signal is obtained as a focus error signal and the second error signal is obtained as a tracking error signal in the optical disc player.

There has been proposed a tracking error signal producing device having a relatively simple arrangement of optical components as shown in FIG. 1. In the device of FIG. 1, a laser light beam emitted from a laser light source 1 is collimated by a collimating lens 2 and then enters through a beam splitter 3 and a quarter-wave plate 4 into an object lens 5 to pass through the same to be caused to impinge thereby on a disc 6 as a reading light beam. The disc 6 has a spiral record track formed with an alignment of pits each having the depth corresponding to, for example, a quarter of the wavelength of the laser light beam from the laser light source 1 and provided in response to information recorded thereby, and is rotated so as to keep the tangential velocity of the spiral record track relative to the laser light beam caused to impinge thereon constant at a predetermined value. The laser light beam reflected from the disc 6, which has been modulated in intensity in accordance with the spiral record track on the disc 6, again enters into the object lens 5 to pass through the same and then enters through the quarter-wave plate 4 into the beam splitter 3. Due to the effect of the quarter-wave plate 4, the reflected laser light beam entering into the beam splitter 3 is linearly polarized in the direction perpendicular to the direction in which the laser light beam leaving from the beam splitter 3 for the disc 6 is linearly polarized. Therefore the reflected laser light beam is reflected at the beam splitter 3 and lead to a photodetector 7. Thus, the reflected laser light beam which has been modulated in intensity in accordance with the spiral record track on the disc 6, that is, the reflected reading light beam is detected by light detecting elements forming the photodetector 7 and electric signals are produced by the light detecting elements in response to the variations in intensity of the reflected reading light beam. These electric signals obtained from the photodetector 7 are supplied to an error signal producing circuit and a tracking error signal which is to be used for controlling, for example, the position of the object lens 5 to perform the tracking control is produced by the error signal producing circuit.

The above mentioned photodetector 7 comprises, for example, four light detecting elements $D_1$, $D_2$, $D_3$ and $D_4$ as shown in FIG. 2 and the reflected reading light beam from the beam splitter 3 forms its beam spot on the light detecting elements $D_1$–$D_4$, as shown by a broken line in FIG. 2. The light detecting elements $D_1$–$D_4$ produce the respective output signals each corresponding to a portion of the beam spot formed on each of the light detecting elements $D_1$–$D_4$ at respective output terminals $d_1$–$d_2$.

Now, the tracking control will be considered hereinafter. The spiral record track on the disc 6 is formed with the arrangement of the pits each having the depth corresponding to a quarter of the wavelength of the reading light beam caused to impinge thereon and the reading light beam irradiating the spiral record track is diffracted by the pits to be reflected thereat. Accordingly, the reflected reading light beam returning through the object lens 5 and attaining to the photodetector 7 to form the beam spot on the light detecting elements $D_1$–$D_2$ forms a diffraction pattern varying in response to the positional relation between each pit on the disc 6 and the beam spot on the disc 6 formed by the reading light beam irradiating the pit. FIGS. 3A, 3B and 3C shown such diffraction pattern and positional relation obtained in several different situations. In each of FIGS. 3A, 3B and 3C, m indicates the positional relation between the pit p and the beam spot 1 of the reading light beam, and n indicates the diffraction pattern (a shaded portion) formed at the exit pupil plane of the object lens 5 by the reflected reading light beam in consequence of the positional relation indicated by m. Four divided portions $D_1'$, $D_2'$, $D_3'$ and $D_4'$ in n shown areas which are to be light-detected by the light detecting elements $D_1$, $D_2$, $D_3$ and $D_4$, respectively. The pit p moves in relation to the beam spot 1 so that the situation indicated by $t_a$ is changed into the situation indicated by $t_b$. In the case of FIG. 3A, the beam spot 1 is deviated on the right side from the center of the pit p. In the case of FIG. 3B, the beam spot 1 is located at the center of the pit p, that is, the reading light beam is maintained in correct tracking relation to the spiral record track on the disc 6. Further, in the case of FIG. 3C, the beam spot 1 is deviated on the left side from the center of the pit p.

From FIGS. 3A, 3B and 3C, it is understood that the diffraction pattern by which the divided portions $D_1'$, $D_2'$, $D_3'$ and $D_4'$ are supplied with the same light amount, respectively, is obtained when the beam spot 1 is located at the center of the pit p, that is, the reading light beam is maintained in correct tracking relation to the spiral record track, and such diffraction pattern that the light amount supplied to the divided portions $D_1'$, $D_2'$, $D_3'$ and $D_4'$ is made asymmetric when the beam spot 1 is deviated on the right or left side from the center of the pit p and the manner of asymmetry of the light amount in the case of the deviation on the right side is contrary to the manner of asymmetry of the light amount in the case of the deviation on the left side. Consequently, it is also understood that a signal varying in response to the positional relation between the beam spot 1 and the pit p, that is, an tracking error signal can be obtained by processing in an appropriate error signal producing circuit the outputs of the light detecting elements $D_1$, $D_2$, $D_3$ and $D_4$ which detect the light amount supplied to the divided portions $D_1'$, $D_2'$, $D_3'$ and $D_4'$, respectively. The tracking error signal thus obtained is to be used for driving, for example, the object lens 5 to move the position thereof in order to maintain the situation in which the beam spot 1 is located at the center of the pit p, as shown in FIG. 3B.

FIG. 4 shows an example of the error signal producing circuit for making the tracking error signal from the outputs of the above mentioned light detecting elements $D_1$, $D_2$, $D_3$ and $D_4$. In this circuit, the outputs of the light detecting elements $D_1$ and $D_4$ are added to each other in an adding circuit 11, and the outputs of the light detecting elements $D_2$ and $D_3$ are added to each other in an adding circuit 12. Then, the subtraction between the outputs of the adding circuits 11 and 12 is performed in a subtracting circuit 13, and further the outputs of the adding circuits 11 and 12 are added to each other in an adding circuit 14.

When the beam spot formed by the reading light beam caused to impinge on the disc 6 moves to traverse to spiral record track formed with the arrangement of the pits from the right to the left, for example, a subtracted signal $S_1$ as shown in FIG. 5A is obtained an the output end of the subtracting circuit 13 and an added signal $S_2$ as shown in FIG. 5B is obtained at an output terminal of the adding circuit 14. The subtracted signal $S_1$ is such a signal as to vary whenever the beam spot formed by the reading light beam passes through each pit and reside in the frequency band of the recorded information signal, and has positional information representing the position of the beam spot formed by the reading light beam in relation to the spiral record track, while the added signal $S_2$ is a reproduced information signal which will be matured into reproduced information. The added signal $S_2$ from the adding circuit 14 is supplied to a rising pulse generating circuit 15 so that a pulse $S_3$ as shown in FIG. 5C is obtained in response to each rising zero crossover point of the added signal $S_2$ at the output terminal thereof and also supplied to a falling pulse generating circuit 16 so that a pulse $S_4$ as shown in FIG. 5D is obtained in response to each falling zero crossover point of the added signal $S_2$ at the output terminal thereof. The subtracted signal $S_1$ from the subtracting circuit 13 is supplied to sampling-and-hold circuits 17 and 18. In the sampling-and-hold circuit 17, the level of the subtracted signal $S_1$ is sampled by the pulse $S_3$ and the sampled level is held, so that an output signal $S_5$ as shown in FIG. 5E is derived therefrom, and in the sampling-and-hold circuit 18, the level of the subtracted signal $S_1$ is sampled by the pulse $S_4$ and the sampled level is held, so that an output signal $S_6$ as shown in FIG. 5F is derived therefrom. Each of the output signals $S_5$ and $S_6$ varies in its polarity to positive from negative or to negative from positive when the position of the beam spot formed by the reading light beam moves to the left from the right in relation to the spiral record track and has the level corresponding to the deviation of the beam spot formed by the reading light beam from the center of the spiral record track. Therefore, each of the output signals $S_5$ and $S_6$ can be used as the tracking error signal. The output signals $S_5$ and $S_6$ are supplied to a differential circuit 19 which performs the subtraction between the output signals $S_5$ and $S_6$ to produce a tracking error signal $S_7$ at an output terminal 20. This tracking error signal $S_7$ is supplied to, for example, a driving circuit provided for driving the object lens 5.

However, in general, a tracking error signal obtained in such a manner as mentioned above is influenced by inclination of a disc surface having a spiral record track thereon in regard to a plane perpendicular to the optical axis of a reading light beam caused to impinge on the disc surface (hereinafter referred to as disc inclination) to vary its level in response to the degree of the disc inclination. For example, even if the amount of deviation of the beam spot formed by the reading light beam from the center of the spiral record track, that is, the amount of tracking error of the reading light beam is constant, the level of the tracking error signal is reduced in proportion as the disc inclination increases. In addition to this, the influence of the disc inclination upon the tracking error signal depends on the size of a pit, which is provided on the disc surface for forming the spiral record track, in the direction along the spiral record track (hereinafter referred to as the pit length), and the manner of variations in the level of the tracking error signal caused by the disc inclination is varied in response to the pit length. For example, in case that the reading light beam generated through the arrangement of optical components shown in FIG. 1 is caused to impinge on a disc having a spiral record track formed with a plurality of pits each having the same pit length and aligned with a space equal to the pit length between each adjacent two of them, and a tracking error signal is produced by the error signal producing circuit shown in FIG. 4 in response to the reflected reading light beam from the disc, the relation between the level L of the subtracted signal $S_1$ derived from the subtracting circuit 13 in response to a constant amount of tracking error and disc inclination K is obtained as shown in FIG. 6 with the parameter of the spatial frequency F of an alignment of pits. As understood from FIG. 6, reduction of the level L of the subtracted signal $S_1$ caused in proportion to increase of the disc inclination K is made more and more steep in proportion as the spatial frequency F decreases, as shown by lines $\alpha$, $\beta$ and $\gamma$ obtained in response to the spatial frequencies of 500 $mm^{-1}$, 333 $mm^{-1}$ and 250 $mm^{-1}$, respectively. This means that the variations in the level L of the subtracted signal $S_1$ obtained in response to a constant amount of tracking error caused by the disc inclination are more and more increased in proportion as the spatial frequency F decreases, that is, in proportion as the pit length increases. In practice, since the spiral record track on a disc is formed with an alignment of pits having various pit length in a predetermined range, the manner of variations in the level L of the subtracted signal $S_1$ caused by the disc inclination K is varied in response to the pit length and accordingly the tracking error signal made from such subtracted signal $S_1$ has undesirable level variations depending on the pit length. This results in that a proper tracking error signal responding correctly to the tracking error is not obtained and consequently tracking control is carried out inaccurately.

OBJECTS AND SUMMARY OF THE INVENTION

Accordingly, it is an object of the present invention to provide an optical disc player in which a reading light beam is caused to impinge on an optical disc having thereon an alignment of geometric variations such as a plurality of pits provided in response to information and a tracking error signal is produced in response to the reading light beam modulated in intensity by the geometric variations and reflected from the optical disc to be used for performing tracking control, and which avoids the above mentioned problem encountered with the prior art.

Another object of the present invention is to provide an optical disc player in which a reading light beam is caused to impinge on an optical disc having thereon an alignment of geometric variations such as a plurality of pits provided in response to information and a tracking error signal is produced in response to the reading light beam modulated in intensity by the geometric variations and reflected from the optical disc to be used for performing tracking control, and which can suppress undesirable variations in the level of the tracking error signal depending on the size of each segment of the geometric variations and resulted from disc inclination, so that accurate tracking control can be performed.

A further object of the present invention is to provide an optical disc player in which a reading light beam is caused to impinge on an optical disc having a record track formed with an arrangement of pits provided in response to information and a tracking error signal is produced in response to the reading light beam modulated in intensity by the record track and reflected from the optical disc to be used for performing tracking control, and which can maintain the reading light beam accurately in correct tracking relation to the record track regardless of disc inclination.

According to an aspect of the present invention, there is provided an improved optical disc player in which the level of a tracking error signal which may have undesirable variations depending on the size of each segment of geometric variations such as pits provided on an optical disc is selectively extracted whenever the tracking error signal is obtained in connection with the segment of geometric variations having its size in a predetermined range so as to suppress the undesirable variations in the level of the tracking error signal depending on the size of each segment of geometric variations and resulted from disc inclination, and tracking control is performed in response to the selectively extracted level of the tracking error signal. In the optical disc player according to the present invention, a signal which has level variations representing the geometric variations provided on the optical disc, for example, a reproduced information signal is utilized for detecting the size of each segment of geometric variations, for example, the pit length. With such an optical disc player according to the present invention, the harmful influence upon the tracking error signal by the disc inclination is reduced and consequently accurate tracking control can be carried out.

The above, and other objects, features and advantages of the present invention will become apparent from the following detailed description thereof taken in conjunction with the accompanying drawings

BRIEF DESCRIPTION OF THE DRAWINGS

FIG. 4 is a schematic block diagram showing an error signal producing circuit including a photodetector employed in a previously proposed tracking error signal producing device;

FIGS. 5A to 5F are waveform diagrams used for explaining the operation of the circuit shown in FIG. 4;

DESCRIPTION OF THE PREFERRED EMBODIMENT

Now, an embodiment of optical disc player according to the present invention will be described hereinafter.

Figure 1:
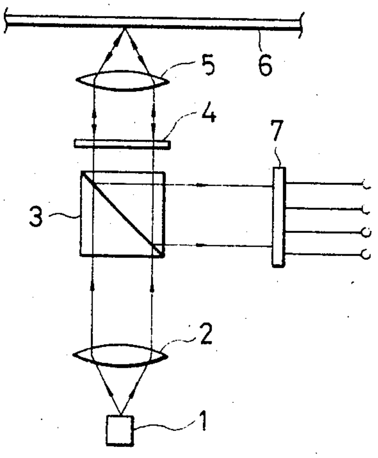
FIG. 1 is a schematic illustration showing an example of an arrangement of optical components employed in a previously proposed tracking error signal producing device.
Figure 2:
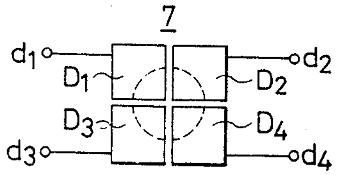
FIG. 2 is a schematic illustration showing the configuration of a photodetector used in the arrangement of optical components shown in FIG. 1.
Figures 3A, 3B, 3C:
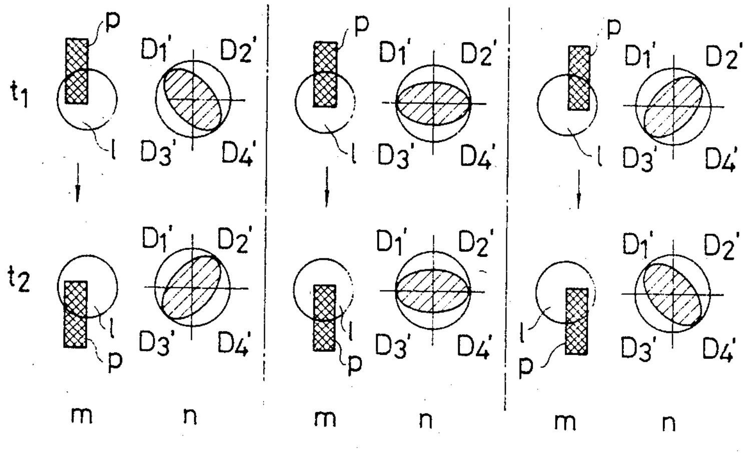
FIGS. 3A, 3B and 3C are illustrations used for explaining the positional relation between a pit forming a record track on an optical disc and a beam spot formed on the optical disc by a reading light beam caused to impinge on the record track.
Figure 6:
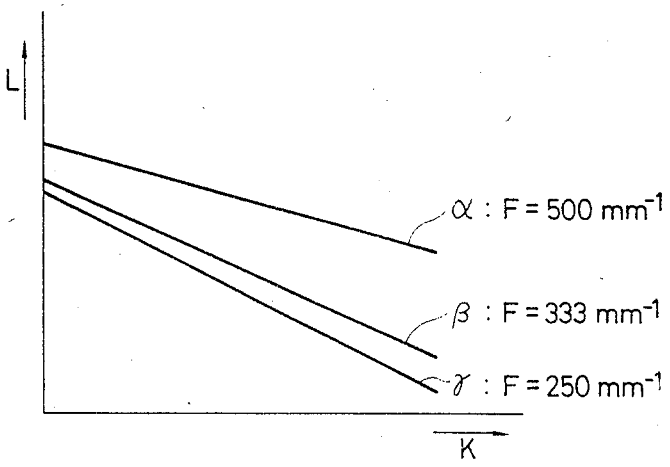
FIG. 6 is a graph used for explaining the output signal characteristic of the tracking error signal producing device employing the arrangement of optical component shown in FIG. 1 and the error signal producing circuit shown in FIG. 4.
Figure 7:
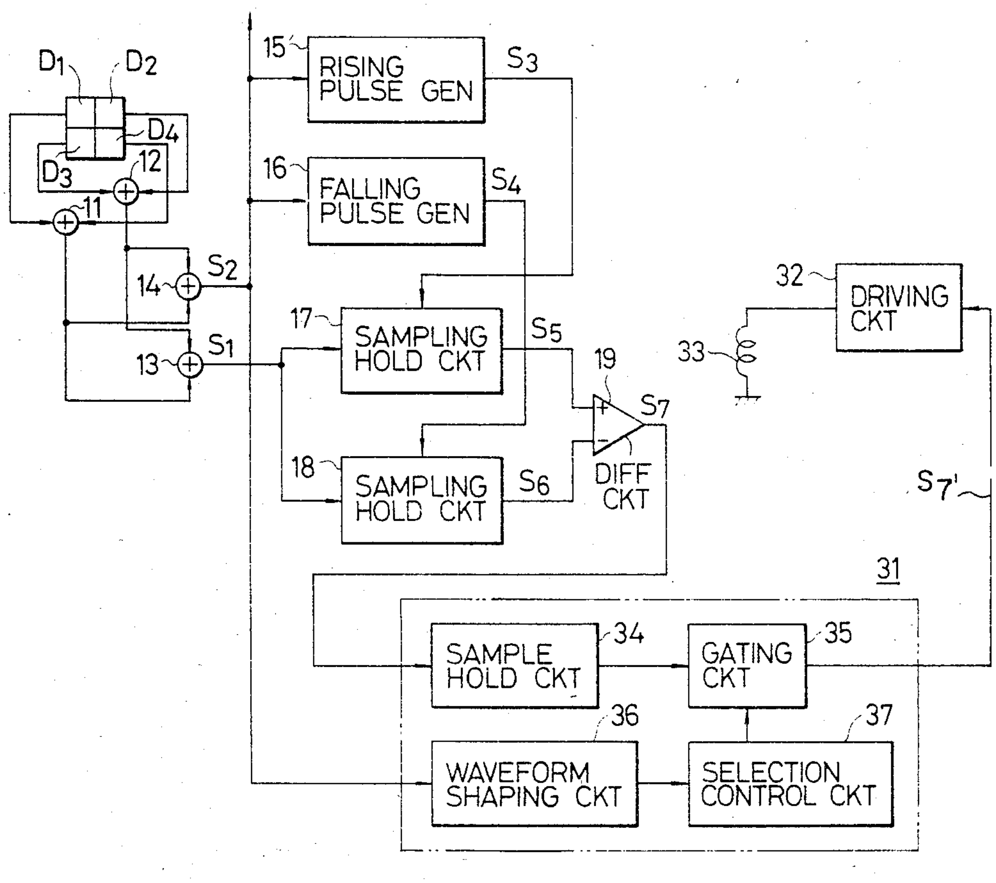
FIG. 7 is a schematic block diagram showing a part of one embodiment of optical disc player according to the present invention.

FIG. 7 shows a part of one example of the optical disc player according to the present invention. This example employs such an arrangement of optical components as shown in FIG. 1 and such an error signal reproducing circuit as shown in FIG. 4 for obtaining the tracking error signal. In FIG. 7, elements, circuit blocks and signals corresponding to those of FIG. 4 are marked with the same references and further description thereof will be omitted. In the example of FIG. 7, a selectively extracting circuit 31 is connected to both the output terminal of the subtracting circuit 19 from which the tracking error signal $S_7$ is obtained and the output terminal of the adding circuit 14 from which the reproduced information signal $S_2$ is obtained. The selectively extracting circuit 31 is operative to detect the duration of a portion corresponding to each pit on the disc of the reproduced information signal $S_2$ which has level variations representing the pits provided on the disc (this duration corresponds to the pit length) to produce an extracting signal whenever the detected duration is measured within a predetermined time range and in accordance with this extracting signal, extract selectively the level of the tracking error signal $S_7$ having the undesirable level variations depending on the pit length, which is supplied from the subtracting circuit 19 Then, a signal $S_7'$ having the level corresponding to the level of the tracking error signal $S_7$ extracted in the selectively extracting circuit 31 is supplied to a driving circuit 32. The driving circuit 32 drives a tracking control device 33 in response to the signal $S_7'$ to perform the tracking control.

The sevectively extracting circuit 31 comprises a series connection of a sampling-and-hold circuit 34 and a gating circuit 35 provided between the output terminal of the subtracting circuit 19 and an input terminal of the driving circuit 32 and another series connection of a waveform shaping circuit 36 and a selection control circuit 37 provided between the output terminal of the adding circuit 14 and a control terminal of the gating circuit 35. The sampling-and-hold circuit 34 is operative to sample the level of the tracking error signal $S_7$ supplied thereto at appropriate regular short intervals and hold the sampled levels. The gating circuit 35 allows the output of the sampling-and-hold circuit 35 to pass therethrough when a signal supplied to the control terminal thereof takes a predetermined low level to produce the signal $S_7'$ and supplies the signal $S_7'$ to the input terminal of the driving circuit 32. The waveform shaping circuit 36 reforms the reproduced information signal $S_2$ into a rectangular waveform signal taking a low level at its portions corresponding to the pits on the disc and a high level at its remaining portions. The selection control circuit 37 is operative to measure the duration of each low level portions of the rectangular waveform signal from the waveform shaping circuit 36 and supplies a pulse having a predetermined low level to the control terminal of the gating circuit 35 as the extracting signal only when the measured duration corresponds to a time within a predetermined reference time range, so that the gating circuit 35 allows the output of the sampling-and-hold circuit 34 to pass therethrough in response to this low level pulse.

The predetermined reference time range set in the selection control circuit 37 to be compared with the duration of the low level portion of the rectangular waveform signal from the waveform shaping circuit 36, that is, the pit length of each pit on the disc, is so selected as to include the time corresponding to the pit length of any pit from which the subtracted signal $S_1$ having relatively small level variations caused due to the disc inclination is obtained and therefore the tracking error signal $S_7$ influenced not so much by the disc inclination is also obtained. For example, the predetermined reference time range set in the selection control circuit 37 is selected to include the time equal to or longer than the time corresponding to the pit length of the shortest pit on the disc and equal to or shorter than the time corresponding to about two-thirds of the pit length of the longest pit on the disc. Accordingly, the selection control circuit 37 supplies the low level pulse to the control terminal of the gating circuit 35 only when the pit length of the pit, from which the tracking error signal $S_7$ having its level influenced not so much by the disc inclination is obtained, is detected and the level of the tracking error signal $S_7$ sampled and held in the sampling-and-hold circuit 34 at that time is gated by the gating circuit 35 to be supplied to the driving circuit 32. This results in that only the level of each portion of the tracking error signal $S_7$ where the influence thereon by the disc inclination is reduced is extracted to produce the signal $S_7'$ as a modified tracking error signal which has suppressed level variations depending on the pit length and resulted from the disc inclination and the tracking control is carried out in response to the modified tracking error signal $S_7'$ thus obtained. Consequently, the tracking control can be acculately performed even if the disc inclination is caused.

Figure 8:
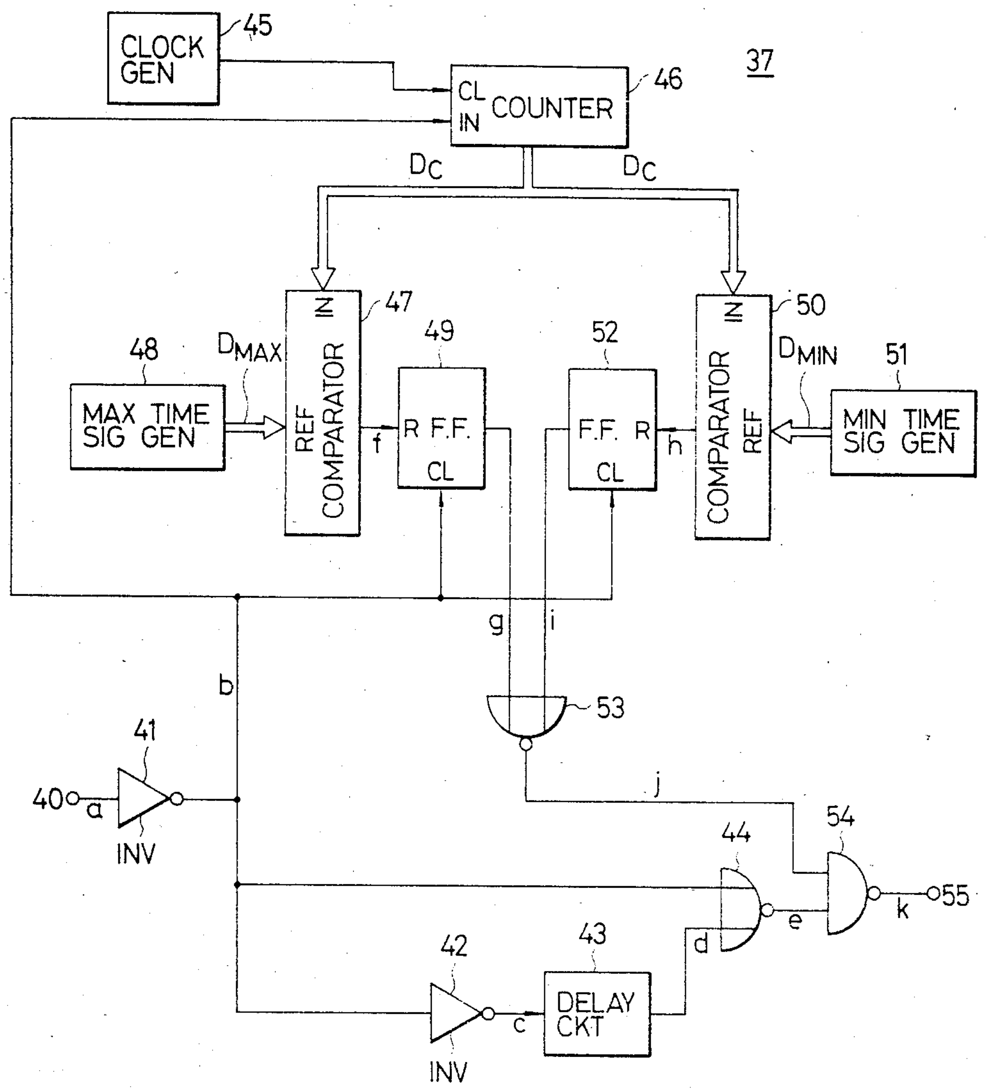
FIG. 8 is a block diagram showing an example of detailed configuration of one of the blocks shown in FIG. 7.

The selection control circuit 37 mentioned above is constructed as shown in FIG. 8, for example. Referring to FIG. 8, a terminal 40 is provided to be connected to the output terminal of the waveform shaping circuit 36. This terminal 40 is connected through inverters 41 and 42 to an input terminal of a delay circuit 43 having its output terminal connected to one input terminal of a NOR-gate 44. The output terminal of the invertenr 41 is also connected to the other input terminal of the NOR-gate 44.

Further, an output terminal of a clock generator 45 is connected to a clock terminal of a counter 46 having its input terminal connected to the output terminal of the inverter 41. An output terminal of the counter 46 is connected to a comparing input terminal of a comparator 47. A reference input terminal of the comparator 47 is connected to an output terminal of a maximum time signal generator 48 and an output terminal of the comparator 47 is connected to a reset terminal of a flip-flop 49. The output terminal of the counter 46 is also connected to a comparing input terminal of a comparator 50. A reference input terminal of the comparator 50 is connected to an output terminal of a minimum time signal generator 51 and an output terminal on the comparator 50 is connected to a reset terminal of a flip-flop 52.

The counter 46 is cleared and caused to commence counting by the rising edge of a signal supplied to its input terminal, then terminated to count by the falling edge of the signal supplied to its input terminal and sends out a time signal corresponding to the result of counting obtained thereby during the counting operation. The comparator 47 produces a pulse having a low level at its output terminal when the time represented by the time signal supplied to the comparing input terminal thereof from the counter 46 is longer than the time represented by a time signal supplied to the reference input terminal thereof from the maximum time signal generator 48. Further, the comparator 50 produces a pulse having a low level when the time represented by the time signal supplied to the comparing input terminal thereof from the counter 46 is longer than the time represented by a time signal supplied to the reference input terminal from the minimum time signal generator 51.

Trigger terminals of the flip-flops 49 and 52 are connected in common to the output terminal of the inverter 41 and output terminals of the flip-flops 49 and 52 are connected to a pair of input terminals of a NOR-gate 53, respectively. The flip-flop 49 is reset by the falling edge of the output of the comparator 47 to have its output of a high level and then triggered by the falling edge of the output of the inverter 41 so that the output thereof is turned to take a low level, while the flip-flop 52 is reset by the falling edge of the output of the comparator 50 to have its output of a low level and then triggered by the falling edge of the output of the inverter 41 so that the output thereof is turned to take a high level.

Output terminals of the NOR-gates 44 and 53 are connecter to a pair of input terminals of a NAND-gate 54 having its output terminal connected to a terminal 55. The terminal 55 is provided to be connected to the control terminal of the gating circuit 35 shown in FIG. 7.

Now, the operation of the selection control circuit 37 thus constructed by way of an example will be explained with reference to the waveforms shown in FIGS. 9A to 9K hereinafter.

Figures 9A, 9B, 9C, 9D, 9E, 9F, 9G, 9H, 9I, 9J, 9K:
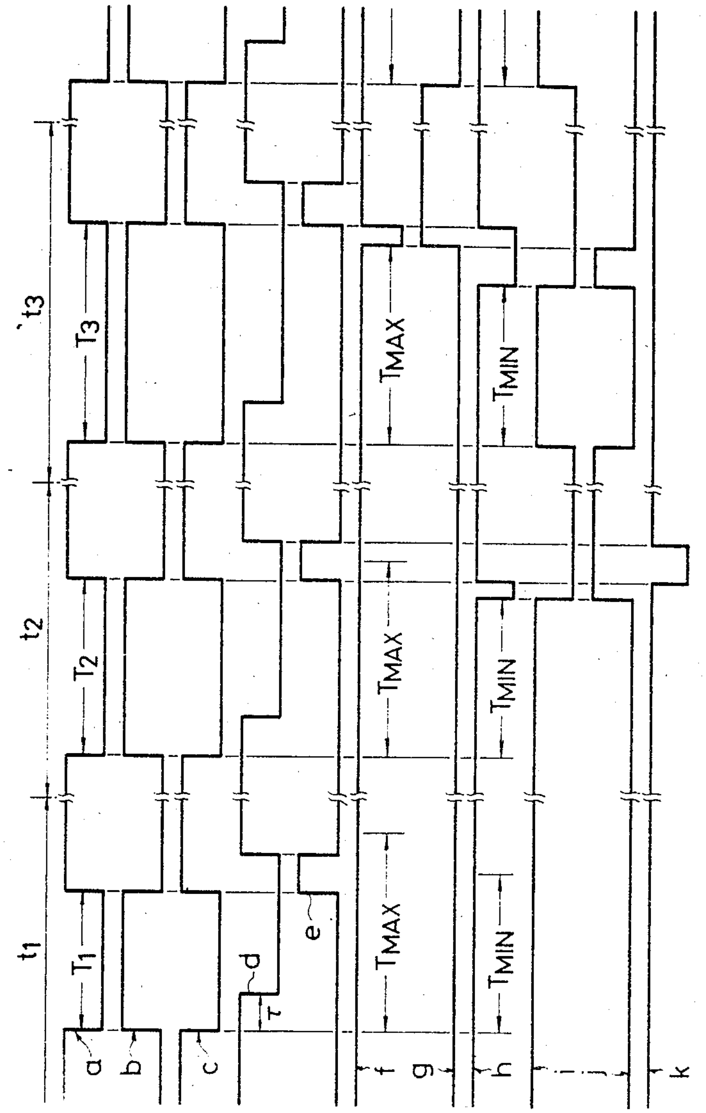
FIGS. 9A to 9K are waveform diagram used for explaining the operation of the block having the configuration shown in FIG. 8.

A rectangular waveform signal a as shown in FIG. 9A, which is obtained from the waveform shaping circuit 36 wherein the reproduced information signal $S_2$ is reformed into the signal a, is supplied to the terminal 40 and inverted by the inverter 41 to be a signal b as shown in FIG. 9B. The signal b is further inverted by the inverter 42 to be a signal c as shown in FIG. 9C. The signal c is delayed by a predetermined time $\tau$ by the delay circuit to be a signal d as shown in FIG. 9D. The signals b and d are supplied to the NOR-gate 44 and consequently a signal e as shown in FIG. 9E is obtained from the NOR-gate 44. This signal e has its rising edge appearing in synchronism with each rising edge of the signal a and its falling edge appearing in synchronism with each rising edge of the signal d.

Clock pulses obtained from the clock generator 45 are supplied to the clock terminal of the counter 46 to be used as count clocks thereto. The counter 46 is reset and caused to commence counting by the rising edge of the signal b supplied to the input thereof. The counting operation of the counter 46 is carried on during each period in which the signal b takes a high level, that is, each period in which the signal a takes a low level and which corresponds to the pit length of each pit on the disc. During the counting operation of the counter 46, a time signal $D_c$ corresponding to the result of counting obtained in the counter 46 is supplied to both the comparators 49 and 50 from the counter 46 to be compared with a maximum time signal $D_{max}$ from the maximum time signal generator 48 at the comparator 49 and with a minimum time signal $D_{min}$ from the minimum time signal generator 51 at the comparator 50, respectively. The maximum time signal $D_{max}$ is so predetermined as to represent the time corresponding to two-thirds of the pit length of the longest pit on the disc, for example, and the minimum time signal $D_{min}$ is also so predetermined as to represent the time corresponding to the pit length of the shortest pit on the disc.

When such a case that the period in which the signal a takes the low level has the length $T_1$ as shown in a time section $t_1$ in FIGS. 9A to 9K, that is, the period in which the signal a takes the low level is shorter than the time $T_{min}$ represented by the minimum time signal $D_{min}$ happens due to some cause, no pulse having a low level appears in a signal h obtained at the output terminal of the comparator 50 as shown in FIG. 9H and further no pulse having a low level appears in a signal f obtained at the output of the comparator 47 as shown in FIG. 9F. At this time, a signal g obtained at the output terminal of the flip-flop 49 as shown FIG. G takes a low level and a signal i obtained at the output terminal of the flip-flop 52 as shown in FIG. 9I takes a high level. Accordingly, a signal j obtained at the output terminal of the NOR-gate 53 takes a low level. This signal j taking the low level and the signal e obtained at the output terminal of the NOR-gate 44 are supplied to the NAND-gate 54 and a signal k obtained at the output terminal of the NAND-gate 54 as shown in FIG. 9K takes a high level.

Accordingly, in this case, no pulse taking a low level is obtained at the terminal 55 and consequently the gating circuit 35 shown in FIG. 7 does not allow the output of the sampling-and-hold circit 34 shown in FIG. 7 to pass therethrough.

When the period in which the signal a takes the low level has the length $T_2$ as shown in a time section $t_2$ in FIGS. 9A to 9K, that is, the period in which the signal a takes the low level is longer that the time $T_{min}$ represented by the minimum time signal $D_{min}$ and shorter that the time $T_{max}$ represented by the maximum time signal $D_{max}$, a pulse having the low level appears in the signal h obtained at the output terminal of the comparator 50. The signal i obtained from the flip-flop 52 is turned to take a low level in synchronism with the falling edge of the low level pulse appearing in the signal h. On the other hand, in this case also, no pulse having the low level appears in the signal f obtained at the output terminal of the comparator 47 because the time represented by the time signal $D_c$, which corresponds to the duration $T_2$, is shoter than the time $T_{max}$ represented by the maximum time signal $D_{max}$. Accordingly, the signal g obtained from the flip-flop 49 keeps to take the low level. The signal g taking the low level and the signal i taking also the low level are supplied to the NOR-gate 53 and the signal j obtained from the NOR-gate 53 takes a high level. This signal j taking the high level and the signal e are supplied to the NAND-gate 54 and a pulse having a low level appears in the signal k obtained from the NAND-gate 54.

As a result of this, in this case, a pulse taking the low level is obtained at the terminal 55 and consequently the gating circuit 35 allows the output of the sampling-and-hold circuit 34 to pass therethrough to be supplied to the driving circuit 32.

Further, when the period in which the signal a takes the low level has the length $T_3$ as shown in a time section $t_3$ in FIGS. 9A to 9K, that is, the period in which the signal a takes the low level is longer than the time $T_{max}$ represented by the maximum time signal $D_{max}$, a pulse having the low level appears in the signal f obtained at the output terminal of the comparator 47 and therefore the signal g obtained from the flip-flop 49 is turned to take a high level in synchronism with the falling edge of the low level pulse appearing in the signal f. The low level pulse also appears in the signal h obtained from the comparator 50, in this case, and the signal i obtained from the flip-flop 52 is turned to take the low level in synchronism with the falling edge of the low level pulse appearing in the signal h. Then, the signal g taking the high level and the signal i taking the low level are supplied to the NOR-gate 53 and the signal j obtained from the NOR-gate 53 takes the high level during the period from the falling edge of the signal i to the rising edge of the signal g. This signal j and the signal e obtained from the NOR-gate 44 are supplied to the NAND-gate 54 and the signal k obtained from the NAND-gate 54 keeps to take the high level.

Accordingly, in this case, the pulse taking the low level is not obtained at the terminal 55 and consequently the gating circuit 35 does not allow the output of the sampling-and-hold circuit 34 to pass therethrough.

As described above, the selection control circuit 37 produces the low level pulse and supplies it to the gating circuit 35 only when the period in which the rectangular waveform signal a which is obtained by reformation of the reproduced information signal $S_2$ having the level variations representing the pits provided on the disc takes the low level, that is, the duration of the portion of the reproduced information signal corresponding to each pit on the disc is measured within the time range which is so selected as to include the time corresponding to the pit length of any pit from which the tracking error signal influenced not so much by the disc inclination is obtained.

In the above described embodiment, it is possible to utilize the output of the photodetector in place of the reproduced information signal for detecting the pit length of each pit on the disc.

Further, although the optical disc having the record track formed with the alignment of the pits is used with the above described embodiment, any optical disc of a different type having a record track formed with an arrangement of geometric variations can be also used with the optical disc player according to the present invention.

What is claimed is:

1. An optical disc player in which a reading beam is caused to impinge on an optical disc having thereon an alignment of geometric variations representing recorded information, said reading light beam being modulated in intensity upon reflection by the geometric variations, and in which a photodetector is provided for detecting the reading light beam coming from the optical disc and for generating an output varying in response to the variation in intensity of the detected reading light beam, comprising:

signal producing means for producing from a reflected light beam a reproduced information signal having level variations representing said geometric variations and a tracking error signal having tracking level variations dependent on the effect of the dimensions of said geometric variations on a level of said output of the photodetector;

selective extracting means for detecting a characteristic feature of a selected one of said reproduced information signal and said output of the photodetector, said characteristic feature having a predetermined range of values corresponding to those geometric variations having dimensions for which said tracking level variations of said tracking error signal are within predetermined acceptable limits, and for extracting selectively said tracking error signal whenever the value of said detected characteristic feature is within said predetermined range so as to produce a modified tracking error signal having an extracted level; and control means for performing tracking control in relation to the reading light beam impinging on the optical disc in response to said modified tracking error signal.

2. An optical disc player according to claim 1, in which said characteristic feature is a time duration of a portion of the seleced signal corresponding to the length of time required for said reading light beam to scan across a corresponding geometric variation in said alignment, said predetermined range of values being a range of time durations corresponding to geometric variations having dimensions in a scanning direction of said reading light beam between predetermined maximum and minimum sizes.

3. An optical disc player according to claim 2, wherein said selective extracting means comprises detecting means for detecting the time duration of each of the portions corresponding to the geometric variations of one of said reproduced information signal and said output of the photodetector and for producing an extracting signal whenever the detected time duration is within said predetermined time range; and level extracting means for extracting the level of said tracking error signal obtained from said signal producing means in accordance with said extracting signal supplied thereto from said detecting means.

4. An optical disc player according to claim 3, wherein said detecting means comprises waveform shaping means for reforming the reproduced information signal obtained from said signal producing means into a rectangular waveform signal having a predetermined level at rectangular portions thereof representing the geometric variations on the optical disc; and selection control means for measuring the time duration of each of said rectangular portions of said rectangular waveform signal obtained from said waveform shaping means and for producing said extracting signal when the measured time duration corresponds to a time within said predetermined time range.

5. An optical disk player according to claim 4, wherein said selection control means includes means for setting said predetermined time range so as to include times corresponding to the geometric variations from which the obtained tracking error signal is influenced only to a relatively small degree by inclination of the optical disc with respect to a plane perpendicular to the optical axis of the reading light beam caused to impinge on the optical disc.

6. An optical disk player according to claim 3, wherein said level extracting means includes sampling-and-hold circuit means for sampling the level of the tracking error signal obtained from said signal producing means at predetermined short intervals and holding the sampled levels, and gating means operative to allow said sampled levels from said sampling-and-hold circuit means to pass therethrough in response to said extracting signal supplied thereto from said detecting means, thereby to feed said modified tracking error signal from said gating means.

* * * * *